(12) United States Patent
Stemmer

(10) Patent No.: US 8,201,400 B2
(45) Date of Patent: Jun. 19, 2012

(54) CLAMPING FLANGE ARRANGEMENT FOR CONNECTING AN EXHAUST SYSTEM TO AN INTERNAL COMBUSTION ENGINE

(75) Inventor: Xaver Stemmer, Reichertshofen (DE)

(73) Assignee: Audi AG, Ingolstadt (DE)

( * ) Notice: Subject to any disclaimer, the term of this patent is extended or adjusted under 35 U.S.C. 154(b) by 522 days.

(21) Appl. No.: 12/523,597

(22) PCT Filed: Jan. 15, 2008

(86) PCT No.: PCT/EP2008/000246
§ 371 (c)(1),
(2), (4) Date: Jul. 17, 2009

(87) PCT Pub. No.: WO2008/087001
PCT Pub. Date: Jul. 24, 2008

(65) Prior Publication Data
US 2010/0078933 A1    Apr. 1, 2010

(30) Foreign Application Priority Data
Jan. 19, 2007   (DE) .......................... 10 2007 002 825

(51) Int. Cl.
*F01N 1/00* (2006.01)
(52) U.S. Cl. ...................................................... 60/323
(58) Field of Classification Search ............... 60/323; 248/56; 403/337
See application file for complete search history.

(56) References Cited

U.S. PATENT DOCUMENTS

| | | | | |
|---|---|---|---|---|
| 5,829,794 A | * | 11/1998 | Schulz-Hausmann et al. | 285/205 |
| 5,918,912 A | * | 7/1999 | Keifel et al. | 285/124.1 |
| 6,789,386 B1 | * | 9/2004 | Haerle | 60/323 |
| 7,185,490 B2 | * | 3/2007 | Smatloch et al. | 60/323 |

FOREIGN PATENT DOCUMENTS

| | | |
|---|---|---|
| DE | 2331510 | 9/1974 |
| DE | 4205454 A1 | 8/1993 |
| DE | 4338719 A1 | 5/1995 |
| DE | 19516375 A1 | 11/1996 |
| DE | 10251771 A1 | 6/2004 |
| EP | 0653583 A2 | 5/1995 |
| EP | 0849446 A1 | 6/1998 |
| EP | 1571305 A1 | 9/2005 |
| FR | 2902458 | 12/2007 |
| WO | WO2008/087001 A1 | 7/2008 |

* cited by examiner

*Primary Examiner* — Thomas Denion
*Assistant Examiner* — Jason Shanske
(74) *Attorney, Agent, or Firm* — Novak Druce + Quigg LLP

(57) ABSTRACT

A connection of an exhaust manifold section to an opening of an internal combustion engine block generally consisting of an end portion of the exhaust manifold received in a recess of the engine block opening in engageable and sealing relation with a surface thereof, and portions received in diametrically opposed undercuts of the recess; a threaded bolt having an axis disposed in a plane of and at an acute angle to a centerline of the exhaust manifold section, and an end portion engaging the exhaust manifold section; a bearing element in which the bolt is threaded having an arcuate surface disposed radially relative to an axis disposed at a right angle to the axis of the bolt and a section of the engine block having a recess in which the bearing element is disposed, having an arcuate bearing surface engaged by the arcuate surface of the bearing element.

14 Claims, 2 Drawing Sheets

CLAMPING FLANGE ARRANGEMENT FOR CONNECTING AN EXHAUST SYSTEM TO AN INTERNAL COMBUSTION ENGINE

The invention relates to a clamping flange arrangement for connecting an exhaust system to an internal combustion engine.

BACKGROUND OF THE INVENTION

Clamping flange arrangements for connection of exhaust systems to internal combustion engines are known. They are used to make available a connection of exhaust pipes, in particular of exhaust manifolds, to gas outlet channels of an internal combustion engine, these manifolds being exposed to high thermal load by the hot gases of the internal combustion engine. The change in the dimensions of the manifold and/or of the outlet region of the internal combustion engine which takes place due to thermal loading must be accommodated by the clamping flange arrangement in such a way that the connection remains tight. At the same time, simple mounting and/or dismounting is desired. In this regard, for example, DE 42 05 454 A1 discloses a device for connecting an elbow to the cylinder head in which the elbow is arranged in the region of the outlet channel of the internal combustion engine by means of the clamping flange and is held by way of a screw which applies force to the top of the elbow transversely to the sealing surface and which is supported with its thread in an inside thread that is integral with the engine block. In this and other known arrangements, it is disadvantageous that the change in length, which takes place due to the thermal expansion in particular of the elbow relative to the engine block of the internal combustion engine, leads to a transverse force in the region of the screw which holds the elbow and/or to deformations of the elbow and/or of the free region of the screw. It is furthermore disadvantageous that this arrangement tends to scaling since on the one hand the normally used materials, specifically aluminum for the engine block of the internal combustion engine and steel for the screw which holds the elbow, tend to corrode in this combination and scaling takes place due to the strong thermal action so that the screw which clamps the elbow after years of operation of the internal combustion engine can only be loosened with very great difficulty.

The object of the invention is to make available a clamping flange arrangement for connecting an exhaust system to an internal combustion engine which avoids these disadvantages.

SUMMARY OF THE INVENTION

For this purpose a clamping flange arrangement for connecting an exhaust system to an internal combustion engine is proposed having at least one undercut which is configured on the internal combustion engine and in which there is inserted a flange region of a clamping flange, and having at least one threaded bolt which is screwed into a thread which is assigned to the internal combustion engine and which with one end applies a clamping force to the clamping flange or a pipe which is attached to the clamping flange, in particular the manifold pipe, of the exhaust system. For this purpose it is proposed that the thread is configured in a bearing element which is movably supported on the thrust bearing of the internal combustion engine. The threaded bolt which, similarly to the versions known in the prior art, applies a clamping force to the manifold pipe, is accordingly guided in a thread which is configured in the bearing element and in this respect is arranged movably to absorb transverse forces and deformations due to the thermally induced change in dimensions, in particular of the manifold pipe, but also of the internal combustion engine, in particular of the engine block. The thread in which the threaded bolt is guided is therefore made not fixed, especially not in one piece with the cylinder head of the internal combustion engine, but can move relative to it or to the internal combustion engine as such.

In one preferred embodiment it is provided that the bearing element is a pivot bearing element. The pivot bearing element is a bearing element which can be pivoted around a pivot axis.

In another embodiment it is provided that the bearing element is a sliding bearing element. A sliding bearing element can be moved in a sliding plane which runs transversely to the longitudinal extension of the threaded bolt, in particular can be moved by sliding.

It is furthermore provided that the clamping flange in one sealing plane fits tightly against the internal combustion engine. Between the clamping flange and the internal combustion engine a plane is therefore formed in which the clamping flange and the internal combustion engine are in a contact position, and in which sealing takes place.

In another preferred embodiment it is provided that the bearing element can be pivoted around a pivot axis which runs transversely to the longitudinal axis of the threaded bolt and crosses the longitudinal axis of the threaded bolt and which lies in a clamping plane in which the longitudinal axis of the threaded bolt lies, the clamping plane enclosing an angle of 90° to the sealing plane. The bearing element therefore has a pivot axis around which it can pivot. The latter lies transversely to the longitudinal axis of the threaded bolt and here crosses the longitudinal axis of the threaded bolt. The pivot axis furthermore lies in the clamping plane in which the axis of the threaded bolt also lies, the clamping plane enclosing an angle of 90° to the sealing plane.

In another preferred embodiment, it is provided that the clamping plane runs through or more or less through the center of the pipe, in particular the manifold pipe, of the exhaust system, which pipe is connected to the internal combustion engine by means of the clamping flange. This means that the clamping plane as the plane in which the clamping force applied by the threaded bolt acts on the pipe, in particular the manifold pipe, runs through the center of just this pipe, viewed in the vicinity of the internal combustion engine. This also means that especially due to thermal expansion and the thermal change in dimensions, it is not necessary for the clamping plane to run exactly through the center of the connected pipe. If, for example, the pipe moves by thermal expansion in operation with hot gases by a small distance in one direction or the other, which can be especially easily observed in pipes which lie outside (i.e., first or last) on the engine block, this results in the clamping plane not running exactly through the center of the pipe, but running eccentrically by just this distance.

In another embodiment, it is provided that the sliding bearing element can be moved along one displacement direction which encloses an angle of 90° with the clamping plane. In the clamping plane (or more or less in the clamping plane) force is applied by the threaded bolt, in the displacement direction the displacement of the respective pipe which is caused by a thermal-induced change of dimensions, in particular a change in length, taking place relative to the internal combustion engine. This sliding bearing element can be displaced exactly along this displacement direction so that the change in the length or dimensions of the pipe can take place at the same time without the action of the force of the threaded bolt being changed disadvantageously relative to the pipe.

Furthermore, it is provided that the threaded bolt is located on one side of the clamping flange and that the flange region is arranged on the side of the clamping flange which is opposite this side. The clamping flange hem is designed, in particular, as the end region of the pipe, the threaded bolt lying or acting on one side of the clamping flange, while the flange region which is located inserted in the undercut, is arranged on the side of the clamping flange opposite the undercut. In this way, a force which runs more or less centrally through the pipe is applied with a uniform resolution of the force and a clamping action when the force is applied with only one threaded bolt.

In another embodiment, it is provided that the pipe, in particular the manifold pipe, is made elastically resilient, in particular elastically resilient at least in the region in which the threaded bolt is acting. By choosing suitable materials the elasticity, especially the elastic deformability of the pipe, to a large extent can be freely determined. By this elastic execution of the pipe the pretensioning force to a large extent can be determined freely in the region in which the threaded bolt acts. For a thermally induced change in the dimensions of the pipe this yields a pretensioning force which is always sufficient for a reliable, tight clamping connection. Nor is this adversely affected by the pivoting of the threaded bolt in the pivot bearing element. Pivoting around the pivot axis does cause a change in the length of the section between the pivot axis and the application region, the threaded bolt of course not undergoing this change in length, but remaining unchanged in its length. The resulting difference in length is, however, equalized without disadvantages by the pretensioning force which is caused by the elastic execution of the pipe.

In another preferred embodiment, the flange region together with the undercut forms an anti-rotation element for the pipe, in particular the manifold pipe. The flange region and the undercut which corresponds to it in this regard are configured such that they do not permit rotation of the pipe around its center or a pivot outside of the center, for example, by forming projections or support regions which extend tangentially to the pipe, relatively to the internal combustion engine. In particular, the flange region can be designed as a tangential, one-sided support surface which is arranged integrally with the pipe on its outside periphery.

DETAILED DESCRIPTION OF THE PREFERRED EMBODIMENTS OF THE INVENTION

Figure 1:
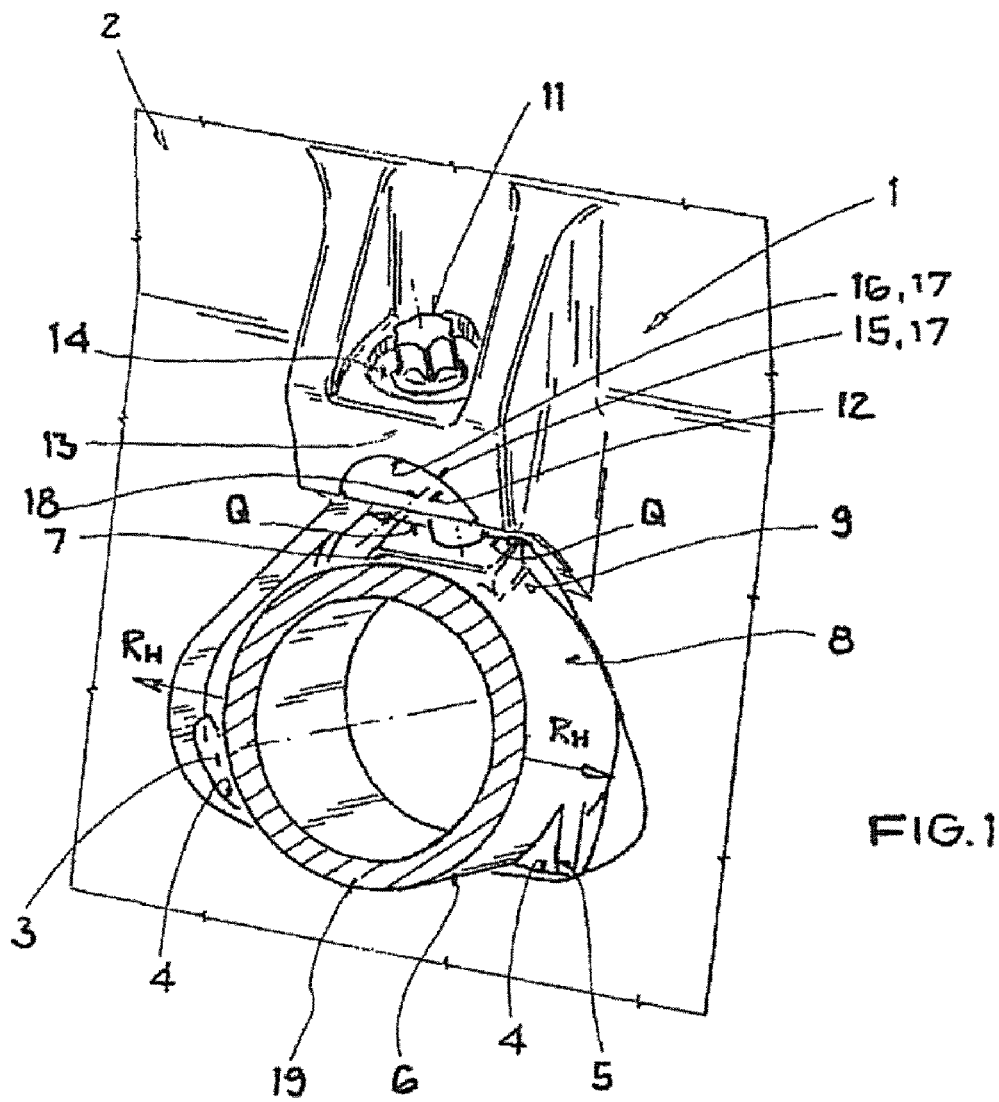
FIG. 1 shows a three-dimensional representation of a clamping flange arrangement according to the invention.

FIG. 1 shows the clamping flange arrangement 1 of an exhaust system of an internal combustion engine 2 which is shown only as a sectional view; the exhaust system is not shown. On the internal combustion engine 2 in an oversized wall recess 3 on the underside there is an undercut 4 which interacts with a flange region 5 which is configured on the underside on the pipe 6. The pipe 6 on which the flange region 5 is configured in one piece is combined with the end region 7 of the internal combustion engine 2, which region faces the internal combustion engine 2 and is viewed in its axial extension. The end region 7 here forms a clamping flange 8 which on its top side 9 which is opposite the flange region 5 has an application region 10 in which the threaded bolt 11 applies a force. The threaded bolt 11 is screwed into a thread which is not visible here, which is assigned to the internal combustion engine 2, and which is configured in a bearing element 12 which is supported on a thrust bearing 13 which is configured on the internal combustion engine 2 and which is opposite the flange region 5. The threaded bolt 11, for this purpose, extends through the thrust bearing recess 14 which is configured in the thrust bearing 13 and which, relative to the diameter of the threaded bolt 11, is appreciably oversized in order to allow radial play of the threaded bolt 11 in the thrust bearing recess 14. If the bearing element 12 is designed with its top side 15 which faces the thrust bearing 13 and which faces away from the pipe 6 as a section of a circular cylinder such that the top side 15 of the bearing element is designed as the jacket surface of a circular cylinder. The bearing element 12 accordingly has a semicircular or almost semicircular cross section. The thrust bearing 13 with is underside 16 has a geometry which is matched in shape and which corresponds to it. The top side 15 of the bearing element and the underside 16 of the thrust bearing in this connection form sliding surfaces 17. The bearing element 12 can thus be pivoted around a pivot axis 18 by means of the sliding surfaces 17. Since the wall recess 3 is oversized relative to the clamping flange 8, the pipe 6 can execute a horizontal motion to a small extent in the horizontal direction $R_H$, a transverse force Q caused by this displacement being applied to the bearing element 12 by way of the threaded bolt 11 and in this way the bearing element 12 being pivoted around the pivot axis 18, the bearing element 12 being supported in a sliding manner on the thrust bearing 13 via the top side 15 of the bearing element and the underside 16 of the thrust bearing, specifically the sliding surfaces 17. In particular, thermal expansion of the pipe 6, which is designed in particular as a manifold pipe 19, can in this way be equalized with contact pressure by the threaded bolt 11 on the internal combustion engine 2, which pressure seals uniformly well.

Figures 2, 3:
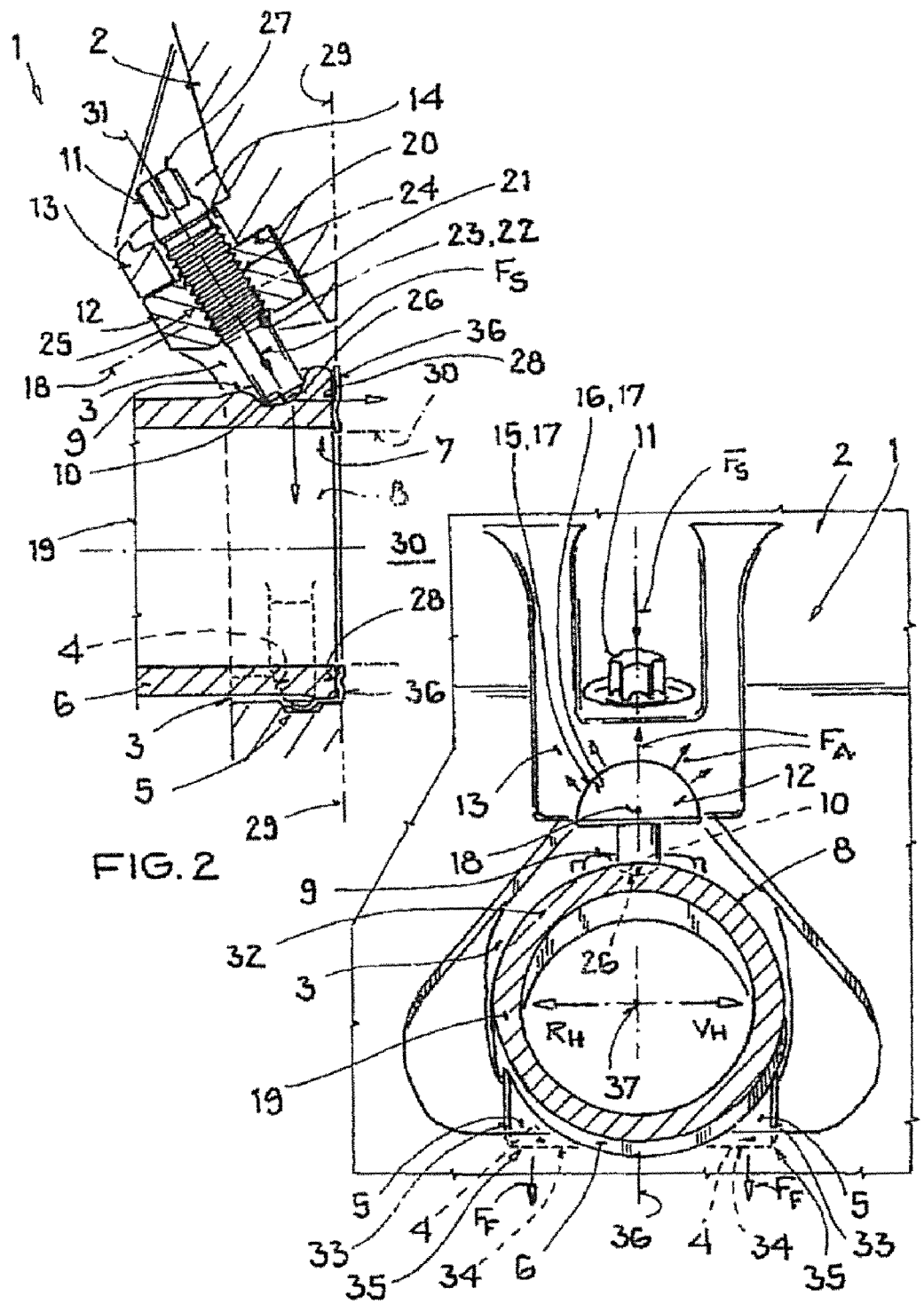
FIG. 2 shows a longitudinal section through a clamping flange arrangement according to the invention and FIG. 3 shows a cross section through a clamping flange arrangement according to the invention.

FIG. 2 shows the clamping flange arrangement 1 in a cross section. On the internal combustion engine 2 is the thrust bearing 13 with the thrust bearing recess 14 which surrounds the threaded bolt 11, in the thrust bearing 13 the bearing element 12 described in FIG. 1 being arranged able to pivot around the pivot axis 18. For this purpose, in the thrust bearing 13 a blind recess 20 is formed which surrounds, on the peripheral side, at least in sections, the bearing element 12 which, as described for FIG. 1, is made at least partially cylindrical, in particular as a section of a circular cylinder, with its back, and which thus enables a defined arrangement in the thrust bearing 13. In the bearing element 12 there is a thread 22 as the inside thread 23 to which an outside thread 24 corresponds in a preferably middle region 25 in the longitudinal extension of the threaded bolt 11. The threaded bolt 11 can accordingly be adjusted lengthwise in the thread 22 by turning axially, as a result of which the length of its thrust end 26, which emerges on the underside from the bearing element 12, changes. If the threaded bolt 11 is screwed out of the thread 22, for example, by means of a tool engagement element made on its head end 27 opposite the thrust end, the threaded bolt 11 is moved away from the clamping flange 8 which is configured on the pipe 6; if, conversely, it is screwed into the thread 22, it is moved by pulling onto the clamping flange 8 until it touches the application region 10 of the clamping flange and is exposed to a force $F_S$. By applying a force $F_S$, the clamping flange 8 is pressed by vector decomposition of the force $F_S$ on the one hand with its flange region 5 located opposite the application region 10 into the undercut 4 of the wall recess 3 located on the internal combustion engine 2, on the other hand in the direction to the outermost end of the end region 7 of the pipe 6 onto the internal combustion engine 2. The internal combustion engine 2 for this purpose has a pipe support surface 28, the pipe support surface 28 and end region 7 of the pipe 6 being opposite one another in the contact position in the sealing plane 29. For passage of exhaust gases the pipe support surface 28 is penetrated by a gas exchange channel 30 which discharges into the pipe 6. Between the pipe support surface 28 and the end region 7 of the pipe 6 there can advantageously be a seal which is not shown here and which, based on its material properties, effects better sealing between the pipe 6 and the pipe support surface 28. The force $F_S$ is applied along the longitudinal axis 31 of the threaded bolt which defines with the pivot axis 18 a clamping plane 36 which encloses an angle of 90° with the sealing plane 29. In the rest position (i.e., in particular in the cold state of the internal combustion engine 2 and of the pipe 6) the clamping plane 36 runs through the center 37 of the pipe 6 in the region of the clamping flange 8. In the application region 10 it is decomposed by vector decomposition into the sealing pressure force $F_D$ and the flange clamping force $F_F$. The sealing pressure force $F_D$ presses the end region 7 of the pipe 6 against the pipe support surface 28, i.e., in the sealing plane 29; the flange clamping force $F_F$ presses the pipe 6 with the flange region 5 into the undercut 4. In this way, a reliable, defined seat of the clamping flange 8 and thus of the pipe 6 on the internal combustion engine 2 with optimum sealing in the sealing plane 29 is accomplished with only one threaded bolt 27.

FIG. 3 shows the above described clamping flange arrangement 1 in cross section. The threaded bolt 11 which has been screwed into the bearing element 12, by way of its support in the bearing element 12 which is supported for its part on the thrust bearing 13, effects application of the force $F_S$ of the application region 10 of the clamping flange 8 of the pipe 6. The clamping flange 8 is arranged inserted with the flange region 5 in the undercut 4 which is not visible here due to the perspective, the clamping flange 8 within the wall recess 3 which is configured on the internal combustion engine 2 being able to execute horizontal displacement $V_H$ in the horizontal direction $R_H$, in particular by thermal expansion of the pipe 6 which is designed as a manifold pipe 19. The force $F_S$ is delivered into the clamping flange 8 in the application region 10, as a result of which, because the threaded bolt 11 in the bearing element 12 it is supported on the thrust bearing 13, application of the support force $F_A$ by the bearing element 12 to the thrust bearing 13 [sic]. Furthermore the flange clamping force $F_F$ is delivered via the undercut 4 to the internal combustion engine 2. The slight horizontal displacement $V_H$ pivots the bearing element 12 around the pivot axis 18, its still being supported on the thrust bearing 13, as described above in FIG. 1 and FIG. 2. Since due to this pivoting motion the distance d between the bearing element 12 and the application region 10 becomes slightly larger, the thrust end 26 of the threaded bolt 11, however, remains of the same length, the threaded bolt 11 therefore remains unchanged with respect to its axial length in the bearing element 12, there is a slight reduction of the force $F_S$ acting on the application region 10. In order to equalize this in a satisfactory manner, the threaded bolt 11 in the rest position of the clamping flange 8 is screwed in so far that the force $F_S$ leads to pretensioning of the pipe 6 over the application region 10. This can be represented especially advantageously by the pipe 6, at least in the region of the clamping flange 8, consisting of an elastic material 32; by way of a suitable material choice, in particular by alloying of certain metals, elasticity which leads to good pretensioning can be easily effected. The flange region 5 here is designed in the form of projections 33 which are made in one piece with the pipe 6, the projections 33 with their projection underside 34 being configured parallel to the undercut. In the interaction of the flange region 5 and the undercut 4 this yields an anti-rotation element 35 with respect to the pipe 6 in its arrangement in the wall recess 3.

REFERENCE NUMBER LIST 1 clamping flange arrangement
2 internal combustion engine
3 wall recess
4 undercut
5 flange region
6 pipe
7 end region
8 clamping flange
9 top side
10 application region
11 threaded bolt
12 bearing element
13 thrust bearing
14 thrust bearing recess
15 top side of bearing element
16 underside of thrust bearing
17 sliding surface
18 pivot axis
19 manifold pipe
20 blind recess
21 bearing element back
22 thread
23 inside thread
24 outside thread
25 middle region
26 thrust end
27 head end
28 pipe support surface
29 sealing plane
30 gas exchange channel
31 longitudinal axis of the threaded bolt
32 elastic material
33 projection
34 projection underside
35 anti-rotation element
36 clamping plane
37 center
$R_H$ horizontal direction
Q transverse force
$F_S$ force
$F_D$ sealing pressure force
$F_F$ flange clamping force
$F_A$ support force
$V_H$ horizontal displacement
d distance

The invention claimed is:

1. A clamping flange arrangement for connecting an exhaust system to an internal combustion engine having at least one undercut which is configured on the internal combustion engine and in which there is inserted a flange region of a clamping flange, and having at least one threaded bolt which is screwed into a thread which is assigned to the internal combustion engine and which with one end applies a clamping force to the clamping flange or a pipe which is attached to the clamping flange of the exhaust system wherein the thread is configured in a bearing element which is movably supported on the thrust bearing of a internal combustion engine.

2. The clamping flange arrangement according to claim 1, wherein the bearing element is a pivot bearing element.

3. The clamping flange arrangement according to claim 1 wherein the bearing element is a sliding bearing element.

4. The clamping flange arrangement according to claim 1 wherein the clamping flange in a sealing plane fits against the internal combustion engine.

5. The clamping flange arrangement according to claim 1 wherein the bearing element can be pivoted around a pivot axis which runs transversely to the longitudinal axis of the threaded bolt and crosses the longitudinal axis of the threaded bolt and which is located in the clamping plane in which the longitudinal axis of the threaded bolt lies, the clamping plane enclosing an angle of 90° to the sealing plane.

6. The clamping flange arrangement according to claim 5 wherein the clamping plane runs through the center of the pipe of the exhaust system, which pipe is connected to the internal combustion engine by means of the clamping flange.

7. The clamping flange arrangement according to claim 1 wherein the sliding beating element can be moved along one displacement, direction which encloses an angle of 90° with the clamping plane).

8. The clamping flange arrangement according to claim 1 wherein the threaded bolt lies on one side of the clamping flange and that the flange region is located on the opposite side of the clamping flange.

9. The clamping flange arrangement according to claim 1 wherein the pipe is made elastically resilient at least in the application region in which the threaded bolt acts.

10. The clamping flange arrangement according to claim 1 wherein the flange region together with the undercut forms an anti-rotation element for the pipe.

11. A connection of an exhaust manifold section to an opening of an internal combustion engine block comprising:
   an end portion of said exhaust manifold section received in a recess of said engine block opening and engageable in sealing relation with a surface thereof, and segments of the end portion received in diametrically opposed undercuts of said recess;
   a threaded bolt having an axis disposed in a plane including and at an acute angle to a centerline of said exhaust manifold sections, and an end portion of said threaded bolt engaging said exhaust manifold section;
   a bearing element in which said bolt is threaded, having an arcuate surface disposed radially to an axis disposed at a right angle to the axis of said bolt; and
   a section of said engine block having a recess in which said bearing element is disposed, having an arcuate beating surface engaged by said arcuate surface of said bearing element.

12. The connection according to claim 11 including a seal disposed between said exhaust manifold section and said engine block.

13. The connection according to claim 11 wherein said exhaust manifold section is circular.

14. The connection according to claim 11 wherein threading said bolt into engagement with said exhaust manifold section provides a force vector pivoting said exhaust manifold section into sealing engagement with said engine block.

* * * * *